United States Patent [19]
Nishikawa et al.

[11] 3,973,640
[45] Aug. 10, 1976

[54] POWER STEERING APPARATUS FOR A VEHICLE

[75] Inventors: Masao Nishikawa, Niiza; Yoshihiko Toshimitsu; Takashi Aoki, both of Asaka, all of Japan

[73] Assignee: Honda Giken Kogyo Kabushiki Kaisha, Tokyo, Japan

[22] Filed: Aug. 19, 1975

[21] Appl. No.: 605,819

[30] Foreign Application Priority Data
Aug. 20, 1974  Japan............................. 49-94595

[52] U.S. Cl.................................. 180/132; 91/434
[51] Int. Cl.².......................................... B62D 5/08
[58] Field of Search................... 180/79.2 R; 91/434, 91/371, 372

[56] References Cited
UNITED STATES PATENTS

| | | | |
|---|---|---|---|
| 2,819,092 | 1/1958 | Proctor et al. | 180/79.2 R X |
| 3,183,992 | 5/1965 | Brueder | 180/79.2 R |
| 3,330,372 | 7/1967 | Brueder | 180/79.2 R |

*Primary Examiner*—Kenneth H. Betts
*Assistant Examiner*—John A. Pekar
*Attorney, Agent, or Firm*—Haseltine, Lake & Waters

[57] ABSTRACT

Power steering apparatus comprising a changeover valve adapted to be operated in one direction or the other by turning of a steering shaft so that a supply oil passage connected to an operational oil pressure source is selectively connected to a right or left chamber of a power cylinder. At least one external oil pressure reaction chamber is arranged to be reduced in volume by the operation in either direction of the changeover valve to resist displacement thereof, the oil pressure reaction chamber being connected through a first oil passage to a control pressure source for delivery of oil at a pressure corresponding to vehicle speed. The first oil passage is connected through a second oil passage to the supply oil passage and a control valve is mounted in the second oil passage to be opened when the pressure within the first oil passage is higher by a predetermined value than the pressure within the supply oil passage. A throttle can be connected in series with the control valve in the second oil passage and a spring loaded relief valve can be provided in a by-pass passage connected in parallel to the second oil passage.

7 Claims, 6 Drawing Figures

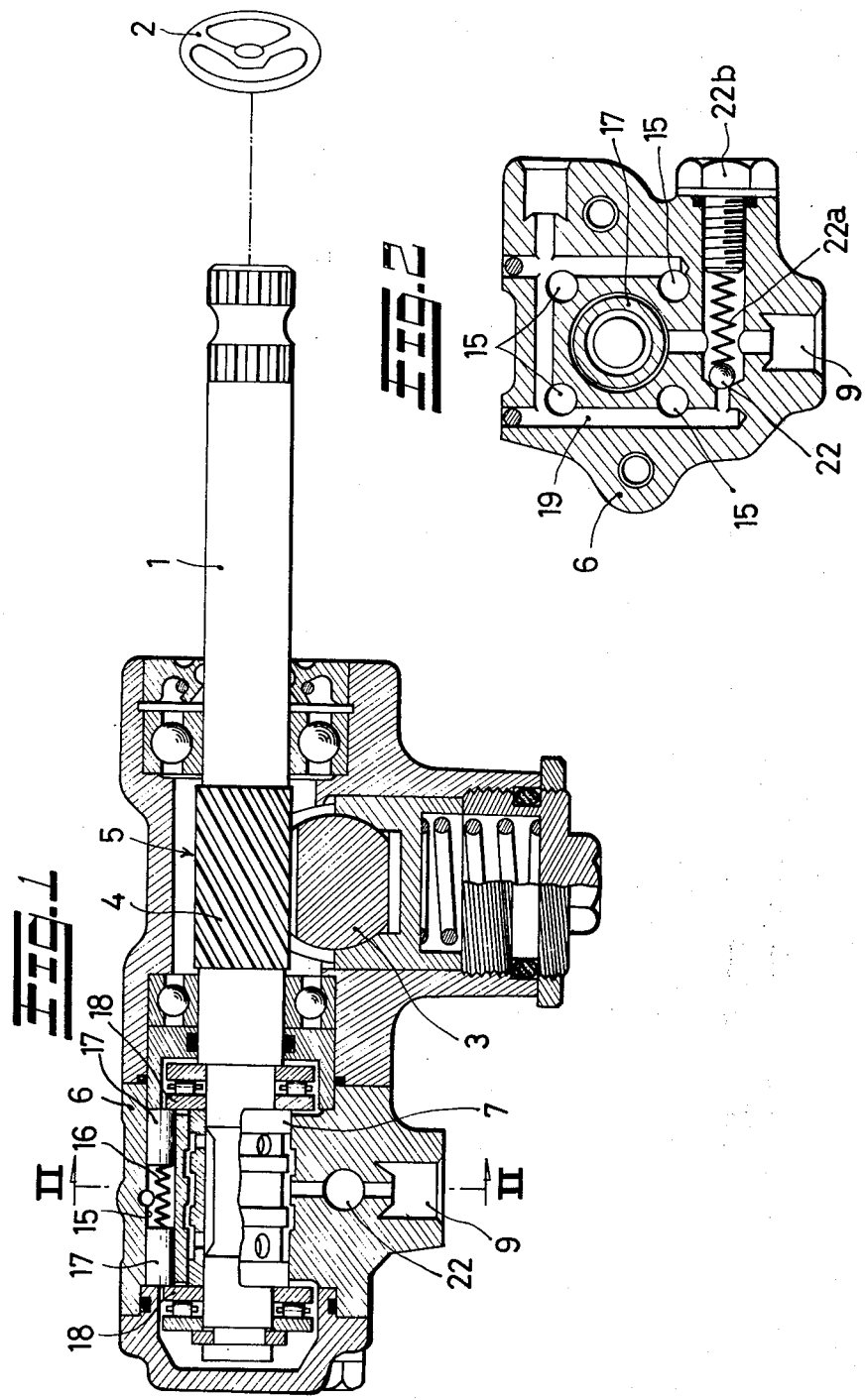

3,973,640

POWER STEERING APPARATUS FOR A VEHICLE

FIELD OF THE INVENTION

This invention relates to power steering apparatus for a vehicle, such as, a motorcar or the like.

BACKGROUND

Generally, it is desirable with this kind of apparatus that steering be effected with a low steering force during low speed driving and when the vehicle speed is increased, the steering force is also increased to prevent oversteering during high speed driving. Furthermore, power assistance should be continuously obtained even upon malfunction of the operational oil pressure source which supplies pressure oil to the power cylinder.

SUMMARY OF THE INVENTION

An object of the invention is to provide an apparatus satisfying the above requirements.

According to this invention, in an apparatus of the type in which a changeover valve is operated in one direction or the other by turning of a steering shaft so that a supply oil passage connected to an operational oil pressure source, such as, an oil pressure pump or the like may be connected selectively to a right chamber or a left chamber of a power cylinder, least one external oil pressure reaction chamber being arranged to be reduced in its volume by the operation in either direction of the changeover valve to oppose operation of such valve, the invention being characterized in that the oil pressure reaction chamber is connected through the first oil passage to a control oil pressure source arranged to generate pressure oil in a delivery amount corresponding to vehicle speed, and the first oil passage is connected through a second oil passage to said supply oil passage, the second oil passage being provided therein with a control valve means which is opened when the oil pressure within the first oil pressure becomes higher, by a predetermined value, than the oil pressure within the supply oil passage.

In further accordance with the invention, a throttle is interposed, in series with the foregoing control valve means, in the second oil passage.

BRIEF DESCRIPTION OF THE DRAWING

FIG. 1 is a sectional side view of one embodiment according to this invention;

FIG. 2 is a sectional view taken along line II—II in FIG. 1;

DETAILED DESCRIPTION

Figure 3:
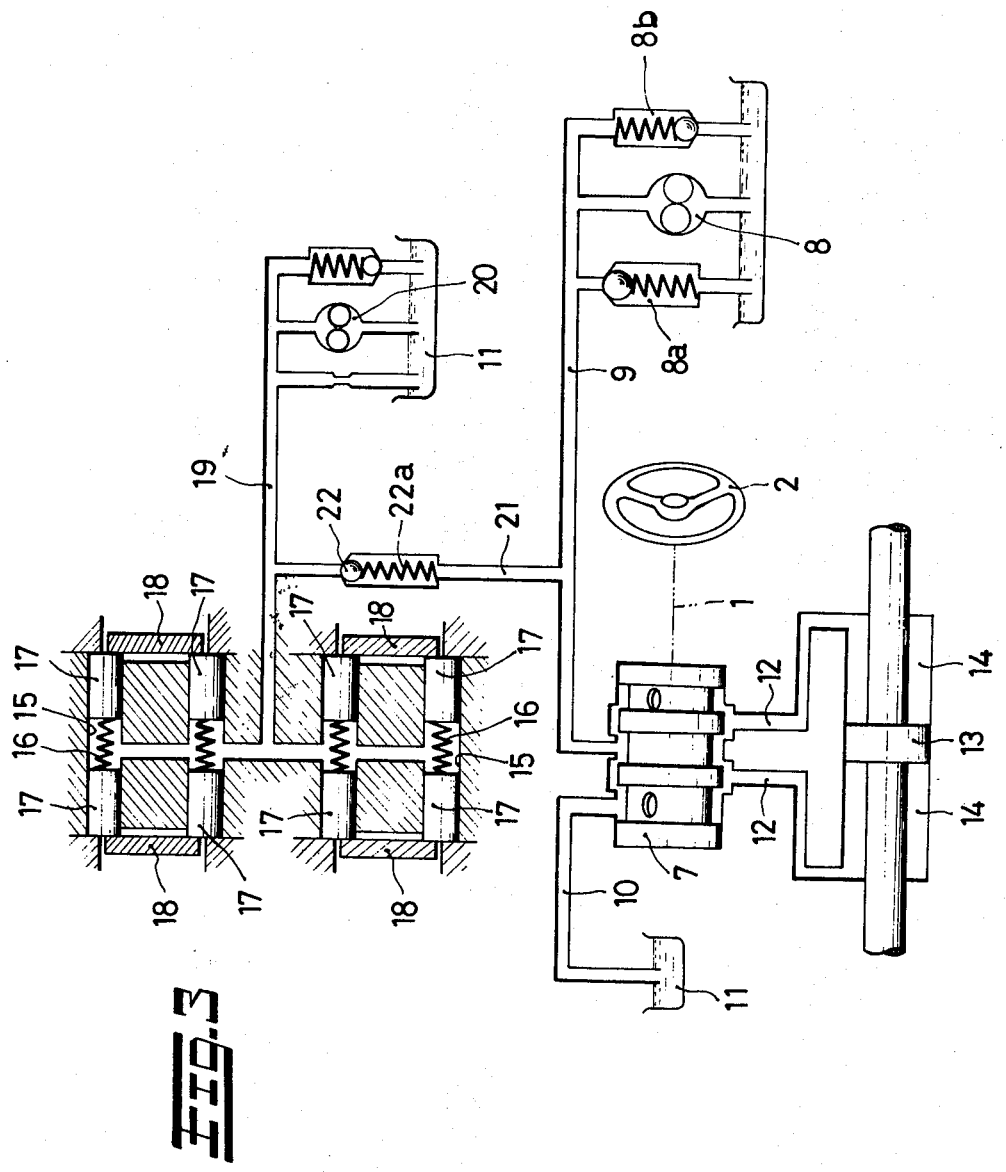
FIG. 3 is a diagrammatic showing of an oil pressure circuit of the embodiment.

Referring to the drawings, numeral 1 denotes a steering shaft in a vehicle and numeral 2 denotes a steering wheel on the rear end thereof. The steering shaft 1 is extended forwards so as to form, in succession a pinion shaft 5 which is rotatable therewith and provided with a spiral pinion 4 in mesh with a spiral type rack 3 on one side thereof, and a changeover valve 7 slidable forwards and rearwards selectively within a valve housing 6 by the action of a longitudinal reaction force acting on the pinion shaft 5 on turning of the spiral pinion 4.

The changeover valve 7 is of a center open type, and operates in such a manner that in the ordinary case, pressure oil supplied through a supply oil passage 9 from an operational oil pressure source 8 comprising an oil pressure pump driven by an external engine is allowed to pass therethrough, as is, for being returned from another side exhaust opening 10 to an oil tank 11. Accordingly, in such condition, no pressure is generated in the supply oil passage 9. By forward or rearward sliding movement of the changeover valve 7, however, the pressure oil is supplied to either one of opposite chambers 14 of a power cylinder 13 through either of a pair of discharge conduits 12, so as to give a predetermined power assistance to the manual steering operation. Thus, in such a condition a pressure corresponding to a road surface resistance is generated in the chamber 14 and accordingly in the supply oil passage 9.

Numeral 8a denotes a relief valve for preventing excess pressure increase and numeral 8b denotes a check valve for preventing generation of a negative pressure.

Numeral 15 denotes an oil pressure reaction chamber which is outside the changeover valve 7 so as to be reduced in its volume by either of the forward or rearward movements of the valve 7. Namely, a pair of front and rear plungers 17 urged apart by a spring 16 are provided within the oil pressure reaction chamber 15 and the plungers 17 are held between a pair of front and rear flanges 18 projecting from the changeover valve 7.

In the illustrated embodiment, four of such reaction chambers 15 are provided, and these are in communication through a first oil passage 19 with an exterior control oil pressure source 20 which generates a pressure corresponding to the vehicle speed and which comprises, for instance, and oil pressure pump driven by a counter shaft or the like of the vehicle.

Additionally, the first oil passage 19 is connected to the foregoing supply oil passage 9 through a second oil passage 21, and a control valve 22 is provided in passage 21 as will be described more fully below.

Namely, the control valve 22 is urged to a closure position both by a spring 22a and the oil pressure within the supply passage 9 while it is urged towards an opening position by the oil pressure within the first oil passage 19. Thus, if the oil pressure within the first oil passage 19 is increased by pressure oil supply from the control oil pressure source 20, the force acting on the control valve 22 to open the same is increased and the control valve 22 is opened against the opposition both of the oil pressure within the supply oil passage 9 and the spring 22a. Thereby, the pressure oil within the first oil passage 19 flows into the supply oil passage 9 and as a result the oil pressure within the first oil passage 19 is lowered. Thus, the oil pressure within the first oil passage 19 may be automatically arranged to be always higher, by the value corresponding to the force of the spring 22a, than the oil pressure within the supply oil passage 9, that is, the oil pressure produced therein in proportion to the road surface resistance.

Figure 4:
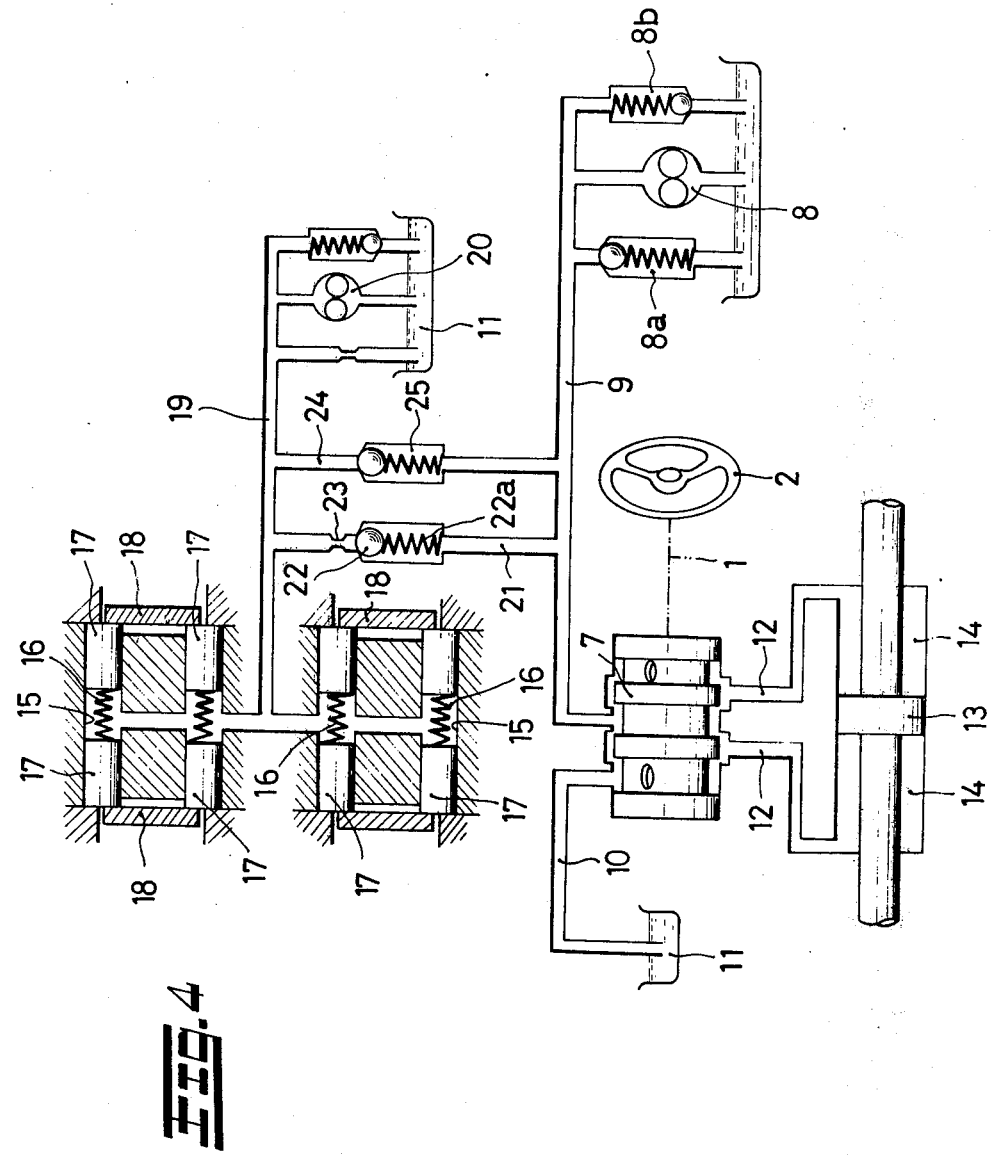
FIG. 4 is a diagrammatic showing of a second embodiment of an oil pressure circuit according to this invention.

FIG. 4 shows a second embodiment of this invention, wherein a throttle 23 is interposed in the second oil passage 21 in series with the control valve 22. Numeral 24 denotes a bypass passage in parallel with the second oil passage 21 between the supply oil passage 9 and the first oil passage 19. Numeral 25 denotes a relief valve in the bypass passage 24 so as to prevent any excess increase of the oil pressure within the first oil passage 19. Valve 25 is subjected to the action of a spring to be opened at a pressure higher than that at which the control valve 22 is opened.

The operation of the apparatus is as follows:

When the vehicle speed is zero, that is, $V_0$, there is no oil pressure generated in the first oil passage 19 and accordingly no oil pressure is applied to the oil pressure reaction chamber 15. If, under this condition, the steering shaft 1 is turned, the changeover valve 7 is operated to slide against the action of the spring 16 within the reaction chamber 15 by the longitudinal reaction force acting on the pinion shaft 5. Thereby one side chamber 14 of the power cylinder 13 comes into communication with the operation oil pressure source 8, so that power assistance is given to the manual steering effort. At this stage, as mentioned before, oil pressure corresponding to road surface resistance is generated in the chamber 14 and also in the supply oil passage 9 connected thereto, but this oil pressure is not supplied to the first oil passage 19, so that the steering force does not increase above a value determined by the strength of the spring 16 within the reaction chamber 15. Thus, the change of the steering force in this case follow the characteristic curve O - $A_0$ - $V_0$ shown in FIG. 5. Here, a bend point $A_0$ is determined by the strength of the spring 16 within the oil pressure reaction chamber 15.

If, then, the vehicle speed is increased to $V_1$, the first oil passage 19 is supplied with pressure oil from the control oil pressure source 20, and the oil pressure within the first oil passage 19, and accordingly, that in the reaction chamber 15 is increased, but this increase is automatically limited by the action of the control valve 22. At this stage, no oil pressure is generated within the supply oil passage 9 before the operation of the changeover valve 7, so that consequently the oil pressure within the reaction chamber 15 is automatically so controlled as to become a value determined by the pushing force of the spring 22a. After the operation of the valve 7, the oil pressure within the supply oil passage 9 serves to assist the spring 16, and it means that the spring 16 is strengthened by such a degree and thereby the point A goes up to a point P. If the changeover valve 7 is changed over and thereby an oil pressure corresponding to the road surface resistance is generated in the supply oil passage 9, the oil pressure within the reaction chamber 15 is also increased in accordance therewith. However, due to leakage of pressure oil around the plungers 17 or to interior leakage of the control oil pressure source 20 or the like, the oil pressure within the reaction chamber 15 does not exceed a certain value. Thus, the characteristic curve thereof becomes O-P-$B_1$-$V_1$. Here, the point $B_1$ is a point at which the leakage amount and the delivery amount from the control oil pressure source 20 are balanced one with another. If the vehicle speed increases to $V_2$, the delivery amount of the control oil pressure source 20 is increased and the point at which the leakage amount and the delivery amount of the source 20 are balanced with one another increases from the point $B_1$ to a point $B_2$, and thus the characteristic curve thereof becomes O-P-$B_2$-$V_2$.

If, meanwhile the operation oil pressure source 8 malfunctions and accordingly the oil pressure within the supply oil passage 9 is lowered or entirely disappears, it is conventional that power assistance is no longer effected. In this embodiment, however, on such occasions, the control valve 22 is opened by the oil pressure within the first oil passage 19, so that the pressure oil from the control oil pressure source 20 can be supplied through the second oil passage 21 into the supply oil passage 9, whereby the power assistance can be continued.

Figure 5:
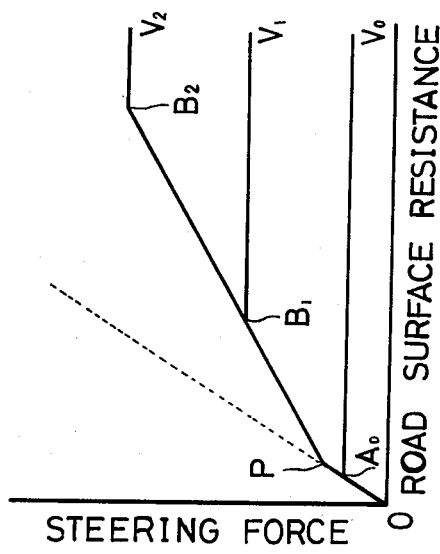
FIG. 5 is a graphical illustration showing the curves of the steering force characteristic according to the first embodiment.

In the embodiment of FIG. 4, the steering force characteristic curve when the vehicle speed is zero, i.e. $V_0$ is not different from that in the foregoing embodiment. If the vehicle speed is increased to $V_1$, the pressure oil delivered from the control oil pressure source 20 is subjected to a pressure drop at the throttle 23, when the oil flows into the supply oil passage 9 while opening the control valve 22. Consequently, the oil pressure within the first oil passage 19 becomes higher than that within the supply oil passage 9, by a value corresponding to the pushing force of the spring 22a and the foregoing pressure drop. Accordingly, the first bend point P as shown in FIG. 5 is raised, in this case, by the amount corresponding to the pressure drop, so as to become point $A_1$. The oil pressure at the time when the delivery amount of the control oil pressure source 20 and the leakage amount are balanced is the same as in the foregoing case.

Figure 6:
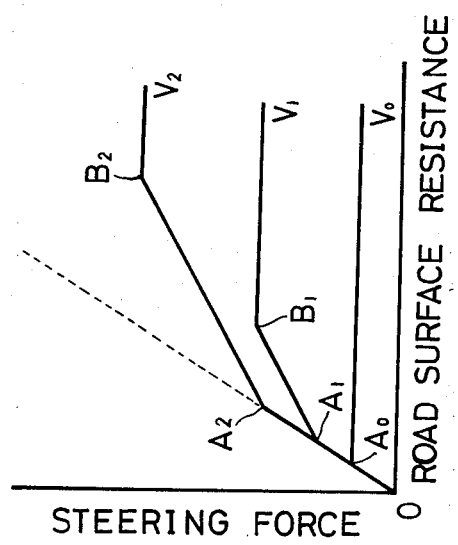
FIG. 6 is a graphical illustration showing the curves of the steering force characteristic according to the second embodiment.

Accordingly, the characteristic curve in this case becomes O-$A_1$-$B_1$-$V_1$ in FIG. 6.

If the vehicle speed is further increased, the delivery amount of the pressure oil from the control oil pressure source 20 is increased, and thus the pressure drop caused by the throttle 23 is also increased and the point $A_1$ is raised to point $A_2$ whereby the characteristic curve becomes O-$A_2$-$B_2$-$V_2$.

If meanwhile, oil pressure source 8 malfunctions, the power assistance can be continued by the action of the control oil pressure source 20 in almost the same manner as above.

The pressure loss caused by the throttle 23 is increased with vehicle speed so that there is a danger that the oil pressure within the first oil passage 19 could be raised excessively. However, in this case the relief valve 25 opens to prevent the oil pressure from being raised excessively.

In the second embodiment, the pressure oil discharged from the relief valve 25 is arranged not to return to the oil tank 11 but to the supply oil passage 9, whereby there is obtained the following advantage.

Namely, the relief pressure of the relief valve 25 is determined by the difference between the oil pressure within the supply oil passage 9 and the oil pressure within the oil passage 19, so that if the maximum oil pressure within the first oil passage 19 is set for example, to be 80 Kg/cm², satisfaction is obtained with a setting in which the relief pressure of the relief valve 25 is 20 kg/cm² and the relief pressure of the relief valve 8a is 60 Kg/cm². Thus, there is generated no oil pressure within the supply oil passage 9 even if the oil pressure within the first oil passage 19 is increased by the pressure loss at the throttle 23 at the time of vehicle straight running, so that the oil pressure within the first oil passage 9 reaches only a maximum of 20 Kg/cm² by the action of the relief valve 25, and accordingly the control oil pressure source 20 can be reduced in load and extended in life. If it is now assumed that the oil pressure discharged from the relief valve 25 is returned to the oil tank 11, it is required that the relief pressure of the relief valve 25 be set to 80 Kg/cm$^2$, and this is not desirable because the control oil pressure source 20 must have a capacity of 80 Kg/cm$^2$ at maximum even at the time of vehicle straight running.

In the disclosed embodiments there is used a changeover valve of the type which is moved forwards and rearwards by turning of a steering shaft, but the invention is not limited thereto and there can be used a changeover valve of the type which is rotated by turning of a steering shaft.

Thus according to this invention, at the time of low speed vehicle travel, steering can be effected by a constant light force regardless of the road surface resistance, and the steering force is increased according to increase of vehicle speed so that oversteering at the time of high speed driving can be prevented, while additionally, even if a malfunction takes place in the operation oil pressure source, power assistance will still be effected by the supply of oil pressure from the control oil pressure source and a safe power steering can be carried out.

According to the second aspect of this invention, the steering force required for power assistance can be increased as the vehicle speed increases, and the steering force at the time of high speed driving becomes larger than that in the foregoing case and thus oversteering can be positively prevented.

What is claimed is:

1. Power steering apparatus comprising a turnable steering shaft, an operational pressure fluid source, a power cylinder having left and right chambers, a supply passage connected to said source, movable changeover valve means coupled to said steering shaft for selectively connecting the left and right chambers to said source by way of said supply conduit depending on the direction of turning of the steering shaft, at least one fluid pressure reaction chamber coupled to said changeover valve means for opposing displacement of the changeover valve means, a control pressure fluid source for supplying pressure fluid at a pressure corresponding to vehicle speed, a first fluid passage connecting said control source to said reaction chamber to supplement the resistance of the reaction chamber to the displacement of the changeover valve means, a second fluid passage connecting the first fluid passage to said supply passage, and control valve means in said second passage for opening when the pressure within the first passage is higher by a predetermined value, than the pressure within the supply passage.

2. Apparatus as claimed in claim 1 wherein said control valve means comprises a valve member and a biassing means acting on said valve member with a force equal in magnitude to said predetermined value.

3. Apparatus as claimed in claim 1 comprising throttle means in said second passage in series with said control valve means.

4. Apparatus as claimed in claim 3 wherein said throttle means is disposed in said second passage between said control valve means and said first passage.

5. Apparatus as claimed in claim 4 wherein said relief valve means includes a biassing means operative to maintain the relief valve means closed until a predetermined pressure is reached in said first passage.

6. Apparatus as claimed in claim 3 comprising a third bypass passage connecting said first passage and said supply passage in parallel with said second passage, and relief valve means in said third bypass passage.

7. Apparatus as claimed in claim 5 comprising a second relief valve means between said supply passage and said operational source.

* * * * *